Patented Aug. 23, 1949

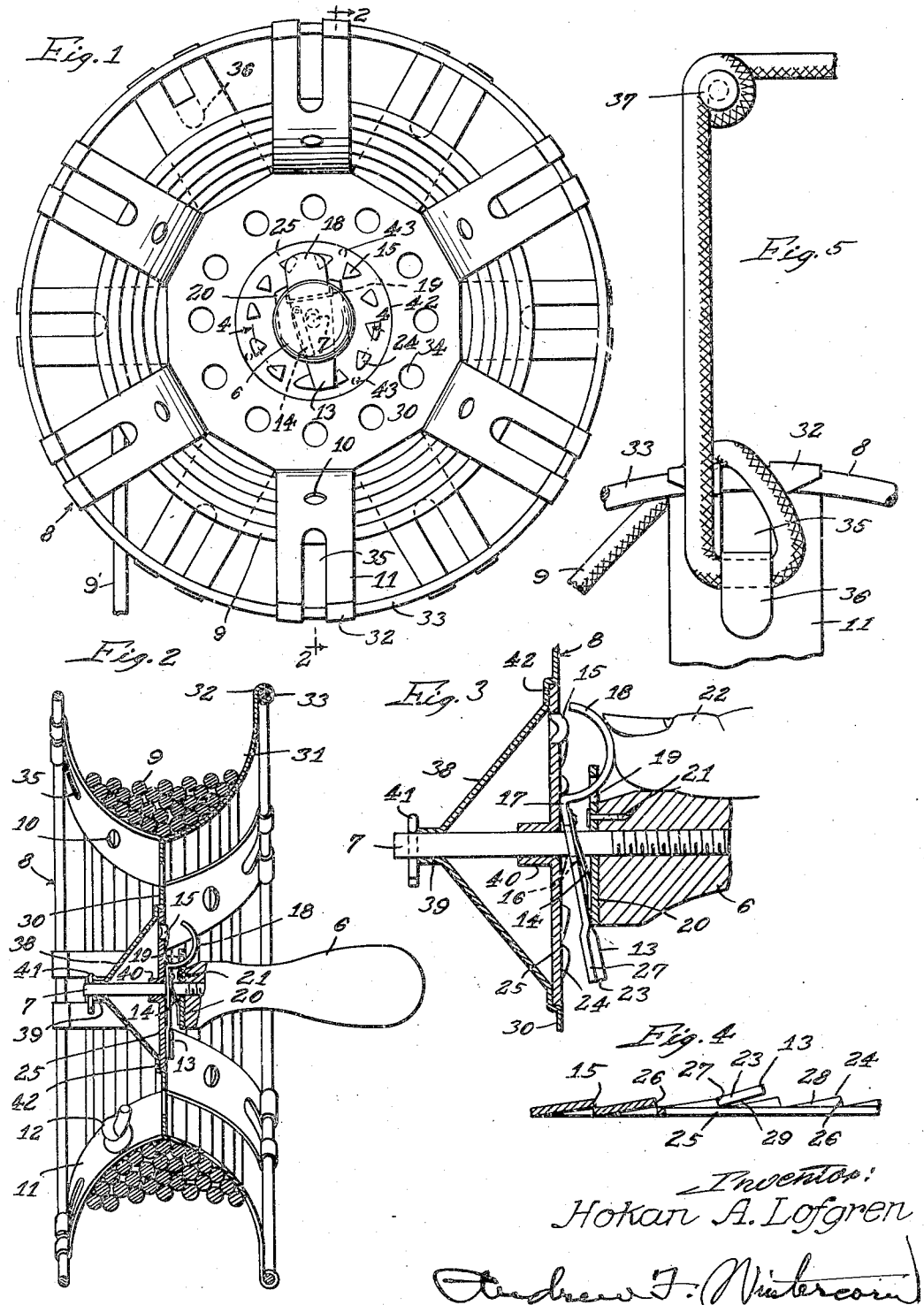

2,479,946

UNITED STATES PATENT OFFICE 2,479,946

CLOTHESLINE REEL

Hokan A. Lofgren, Rockford, Ill.

Application October 24, 1945, Serial No. 624,125

20 Claims. (Cl. 242—96)

This invention relates to clothesline reels.

The principal object of my invention is to provide a simpler and more economical form of clothesline reel and one which although the spring rewind mechanism usually employed in devices of this kind is eliminated for reasons of economy still operates just as handily, if not more so, than the spring rewind type.

A salient feature of the reel of my invention consists in the provision of a handle for carrying the reel, equipped with a quickly releasable pawl that cooperates with ratchet teeth provided in circumferentially spaced relation on the side of the reel concentric with the axle on the handle on which the reel turns, this novel combination of pawl and ratchet forming an overrunning clutch by means of which the reel may be given rotation at will by a turn of the hand or wrist on the part of the operator holding the handle, although whenever desired the pawl may be released and the reel is then free to turn in either direction relative to the handle, the pawl when held in released position being also usable as a brake shoe to slacken the spinning of the reel, if that is desired, if the operator merely increases thumb pressure against the pawl. The pawl is normally held under light spring pressure in the clutch position, thus imposing very light frictional drag upon the manually propelled rotation of the reel, while still providing positive clutch action whenever the operator desires to impart another impulse to rotate the reel.

Another important feature of the reel of my invention is the substantially one-piece sheet metal construction of the reel body, which enables production of the reel at a small fraction of the cost of other reels with which I am familiar, the body proper being punched and formed from a single piece of sheet metal and there being only a small ratchet disk required in the hub portion to complete the body, this disk being suitably spot welded in place to provide the ratchet teeth and also one of two axially spaced bearings for the axle, the other of which is provided on an embossed hub portion of the main body part.

The invention is illustrated in the accompanying drawing, in which

Figure 1 is a side view of a clothesline reel made in accordance with my invention and showing a clothesline wound thereon;

Fig. 2 is a cross-section on the line 2—2 of Fig. 1;

Fig. 3 is an enlarged sectional detail of the hub portion, indicating how the pawl is adapted to be held released by thumb pressure;

Fig. 4 is an enlarged developed detail partly in section and partly in elevation on the line 4—4 of Fig. 1 illustrating the one-way clutch action of the pawl on the ratchet, and Fig. 5 is an enlarged fragmentary view to illustrate the handy method of hanging the reel adjacent the last of a series of hooks or nails over which the line is strung during use.

The same reference numerals are applied to corresponding parts throughout these views.

The reel of my invention, as clearly illustrated in Figs. 1 and 2, comprises a handle 6 carrying an axle 7 on which is rotatably mounted a reel 8 to wind or unwind the clothesline 9, the inner end of which is entered through a hole 10 in one of the spokes 11 of the reel and knotted, as indicated at 12, to fasten this end of the line to the reel. The other end of the line extends from the reel, as indicated at 9'. The handle 6 is grasped in carrying the reel and in supporting the same for rotation in either direction on the axle 7, as in winding and unwinding. The reel is so light even with a full length line wound thereon that one can easily carry it in one hand by means of the handle 6. As will now be described, the handle through the medium of the pawl or driving dog 13 thereon urged by the spring 14 toward engagement with the one side of the drive teeth of the ratchet 15 on the reel is adapted to be used in spinning the reel by rotary impulses transmitted from the handle through the pawl and ratchet to the reel, these impulses being given by quick turns or twists of the hand or wrist while the operator is holding the handle.

The pawl or driving dog 13 is formed from an elongated piece of sheet metal having an opening 16 intermediate the ends thereof which is large in relation to the axle 7 that projects through the opening so that the pawl is free to be tilted on its fulcrum point 17, which is next to the hook-shaped end portion 18 of the pawl that projects through an opening 19 in a plate 20 secured on the inner end of the handle 6 in any suitable manner, small nails being indicated at 21. The hook portion 18 forms a convenient thumb piece projecting radially from the inner end of the handle by means of which the latch may be held in disengaged relation to the ratchet 15, as indicated at 22 in Fig. 3, where the thumb of the operator's hand that grips the handle 6 is indicated pressed against the hook portion 18 to hold the pawl 13 in the tilted position against the resistance of the spring 14. The spring 14 is a leaf spring suitably secured at one end to the pawl 13 near the fulcrum point 17 and slidably engaging the plate 20 at its other end, whereby to urge the pawl under light spring pressure into engagement with the ratchet. When the pawl is tilted out of engagement with the ratchet, the end portion 23 of the pawl, which is twisted to acute angle relationship to the rest of the pawl, as best appears in Figs. 3 and 4, is held in spaced relation to the drive teeth 24 of the ratchet 15, as shown in Fig. 3, and the reel is accordingly free to turn in either direction relative to the handle. The pawl under these circumstances does not impose any appreciable resistance to turning of the reel, particularly since the fulcrum point 17, at which the pawl has sliding engagement with the ratchet disk 25, is so close to the axle 7 on which the reel turns. However, if the operator desires to slacken the speed of the reel, he can do so by merely increasing thumb pressure against the pawl, as should be clear from the illustration in Fig. 3. The teeth 24, as clearly appears in Figs. 1 and 4, are in the form of "eyebrow" projections struck from the sheet metal ratchet disk 25 so that there are substantially right angle faces 26 for clutching engagement with the edge portion 27 of the pawl and inclined faces 28 in acute angle relation to the disk 25 for sliding engagement with the similarly inclined adjacent face 29 of the pawl. It is clear, therefore, that very little movement of the end 23 of the pawl 13 is involved in engagement or disengagement, and it follows, therefore, that the pawl does not impose any appreciable frictional drag upon the turning of the reel relative to the handle 6, such rotation being permitted in one direction, the reasons being that the spring 14 to begin with is capable of exerting only light spring pressure and, furthermore, is active near the fulcrum point 17, which is remote from the ratchet engaging end of the pawl. The thumb pressure required is furthermore lightened as a result of the fact that the spring 14 acts against the pawl at a point so close to the fulcrum point 17. The pawl, despite the light spring pressure required for its engagement with the ratchet, provides a very positive and reliable means of transmitting rotary impulses from the handle 6 to the reel 8 when the operator gives the handle a quick turn. The manual rotation of the reel in this manner is about equally as simple with the handle 6 in substantially right angle relation to the forearm or in substantial alignment with the forearm, and, hence, regardless of the wrist strength or weakness of the woman using the reel, there is not apt to be any fatigue connected with its operation.

The reel 8, in accordance with my invention, has a one-piece sheet metal body 30 of substantially circular form. The spokes 11 previously mentioned are integral with the body and project radially from the periphery thereof, alternate spokes being bent in one direction and intermediate spokes being bent in the opposite direction from the plane of the body to define the annular winding groove or channel 31 to receive the clothesline 9. The outer ends of the spokes 11 are curled, as indicated at 32, and mount therein the wire rings 33 to form continuous outer rim portions for the reel. The body 30 has a series of lightening holes punched therein, as indicated at 34, in circumferentially spaced relation with respect to the handle 6. The holes 10, previously mentioned, provided in the spokes 11 also are for lightening the reel in addition to affording a place to fasten the inner end of the clothesline, as previously indicated. There are also longitudinal slots 35 provided in the outer ends of the spokes for lightening the reel, and one of the spokes has the metal which is struck from the spoke to form a slot 35 therein bent outwardly substantially into parallelism with the spoke to form a hook 36, over which the clothesline 9 may be extended when it is desired to hang the reel on the last of a series of hooks or nails over which the clothesline is strung during use, as indicated at 37 in Fig. 5. In that way the unused portion of the line left on the reel can be kept taut and the reel is at the same time hung out of the way. This same hook can be used for fastening the free end of the line when the line and reel are not in use. The central portion 38 of the body 30 of the reel is embossed to substantially a conical form and is pierced and extruded to provide a bearing portion 39 at the apex of the conical portion and normal to the plane of the body. This bearing 39 receives the axle 7 and is in coaxial relation with another bearing 40 provided at the center of the ratchet disk 25. The axle extends through the aligned bearings and has a cotter pin 41 inserted in a hole in the projecting end thereof to retain the reel on the axle with the pawl 13 in operative relation to the ratchet. An annular recess 42 is preferably provided in the body 30 defining the large end of the conical portion 38 and the disk 25 is entered in this recess and is spot welded to the body 30 at a number of circumferentially spaced points, as indicated at 43 in Fig. 1. The fact that the disk 25 is separate from the body 30 is of advantage aside from the standpoint of simplicity and economy of construction, because it makes it feasible to provide a hardened steel ratchet that will not wear out after the reel has been in service a short time. The recess 42 is of advantage not only because the ratchet disk fitting therein lies flush with the outside of the reel, for improved appearance, but this construction makes it an easy matter to obtain accurate alignment of the bearings 39 and 40. The wide spacing of the bearings 39 and 40, of course, results in easier and smoother turning of the reel relative to the axle.

The operation of the reel is believed to be clear from the foregoing description. The operator carries the reel with one hand by means of the handle 6 and in unwinding clothesline holds the pawl 13 disengaged from the ratchet 15, thus permitting the reel to turn freely. It is during unwinding that the reel is apt to be spun too fast by reason of a sudden jerk on the line, in which event there would be danger of some of the line getting dirty by contact with the ground, and it is for that reason that a braking action is desirable. The operator has to hold the pawl in disengaged position, as shown in Fig. 3, while paying out line, and it is, therefore, a simple matter for him to apply heavier thumb pressure against the pawl if he finds it necessary to slacken the speed of the reel. In rewinding the clothesline onto the reel, the operator spins the reel by means of the handle, giving the handle quick turns in the winding direction to cause the reel to spin in that direction. With the present construction I have taken advantage of the momentum imparted to the reel by the sudden manual impulses whereby to obtain with very little effort a practically unlimited amount of rotation of the reel, far beyond what is ordinarily obtainable in spring type reels with very complicated and expensive rewind mechanisms. A further advantage lies in the fact that with the present construction there is still available as powerful operation of the reel as one nears the outer end of the line as at any other point, whereas in the spring type reels it is well known that the rewinding force becomes more and more feeble as the spring action is spent. On the other hand with the present reel the unwinding does not involve any greater resistance as one approaches the inner end of the line in unwinding than at any other point in this operation, whereas it is well known that in the spring type reels there is greater and greater resistance to turning of the reel as more and more line is unwound.

It is believed the foregoing description conveys a good understanding of the objects and advantages of my invention. The appended claims have been drawn to cover all legitimate modifications and adaptations.

I claim:

1. A reel of the class described comprising a handle, an axle extending from one end of the handle, a reel rotatable freely on said axle in either direction relative to the handle, and a manually releasable one-way drive overrunning clutch drivingly connecting the handle and reel for turning the reel by rotary impulses from the handle in one direction relative to the handle, said clutch when released permitting free turning of the reel in either direction relative to the handle.

2. A reel of the class described comprising a handle, an axle extending from one end of the handle, a reel rotatable freely on said axle in either direction relative to the handle, a circular ratchet on the reel in substantially concentric relation to the axle, a pawl drivingly connected with the end of the handle adjacent the reel and extending radially relative to the axle for engagement with the ratchet to provide a one-way drive overrunning clutch connection between the handle and reel for turning the reel by rotary impulses from the handle in one direction relative to the handle, spring means urging said pawl toward engagement with the ratchet, and manually operable means for holding the pawl in disengaged position against the action of said spring means, whereby to permit free turning of the reel in either direction relative to the handle.

3. A reel of the class described comprising a handle, an axle extending from one end of the handle, a reel rotatable freely on said axle in either direction relative to the handle, a circular ratchet on the reel in substantially concentric relation to the axle, a pawl oscillatably mounted relative to the handle between the handle and reel and held against turning relative to the handle, said pawl having one end portion extending radially relative to the axle for clutching engagement with the ratchet to provide an overrunning clutch connection between the handle and reel for turning the reel by rotary impulses from the handle in one direction relative to the handle, spring means tending to hold said pawl engaged with the ratchet, and means on the other end portion of the pawl for holding the same cocked in disengaged relation to the ratchet against the action of said spring means.

4. A reel of the class described comprising a handle, an axle extending from one end of the handle, a reel rotatable freely on said axle in either direction relative to the handle, a circular ratchet on the reel in substantially concentric relation to the axle, a pawl loosely mounted on the axle between the end of the handle and the reel but held against turning relative to the axle and handle, said pawl having one end portion thereof extending radially relative to the axle for clutching engagement with the rachet to provide an overrunning clutch connection between the handle and reel for handle propelled rotation of the reel relative to the handle in one direction, spring means tending normally to urge said end portion toward the ratchet, said pawl having a fulcrum portion intermediate the ends thereof for engagement with the reel and relative to which the pawl is adapted to be oscillated, and manually operable means on the other end of said pawl for tilting the pawl about its fulcrum point against the action of said spring means so as to cause disengagement of the pawl from the ratchet.

5. A reel of the class described comprising a handle, an axle extending from one end of the handle, a reel rotatable freely on said axle in either direction relative to the handle, a circular ratchet on the reel in substantially concentric relation to the axle, a pawl loosely mounted on the axle between the end of the handle and the reel, said pawl having one end portion thereof extending radially relative to the axle for clutching engagement with the ratchet to provide an overrunning clutch connection between the handle and reel for turning the reel relative to the handle in one direction, spring means tending normally to urge said end portion toward the ratchet, said pawl having a fulcrum portion intermediate the ends thereof for engagement with the reel and relative to which the pawl is adapted to be oscillated, and a hook portion on the other end of said pawl projecting outwardly from the reel through an opening provided therefor in the end of the handle, whereby to hold the pawl against turning relative to the handle, said hook portion being also adapted for manual engagement to tilt the pawl about its fulcrum point against the action of the aforesaid spring means to disengage the pawl from the ratchet.

6. A reel of the class described comprising a handle, an axle extending from one end of the handle, a reel rotatable freely on said axle in either direction relative to the handle, a circular ratchet on the reel in substantially concentric relation to the axle, a pawl loosely mounted on the axle between the end of the handle and the reel, said pawl having one end portion thereof extending radially relative to the axle for clutching engagement with the ratchet to provide an overrunning clutch connection between the handle and reel for turning the reel relative to the handle in one direction, said pawl having a fulcrum portion intermediate the ends thereof and on the opposite side of the axle from the ratchet engaging end portion, said fulcrum portion being arranged to engage the reel for tilting movement of the pawl relative to the ratchet for disengagement, a leaf spring acting between the fulcrum portion and the handle to urge the pawl toward the ratchet, and a hook portion on that end of the pawl next to the fulcrum portion extending outwardly relative to the reel through an opening provided therefor in the end of the handle, whereby to hold the pawl against turning relative to the handle, said hook portion being also adapted for manual engagement to tilt the pawl about its fulcrum point against the action of the aforesaid leaf spring to disengage the pawl from the ratchet.

7. In a manually propelled rotary device, the combination of a handle, an axle thereon, a spinner rotatably mounted on the axle, a circular ratchet on the spinner in substantially concentric relation to the axle, a pawl drivingly connected with the end of the handle adjacent the spinner and extending radially relative to the axle for engagement with the ratchet to provide a one-way drive overrunning clutch connection between the handle and spinner for turning the spinner by rotary impulses from the handle in one direction relative to the handle, spring means urging said pawl toward engagement with the ratchet, and manually operable means for holding the pawl in disengaged position against the action of said spring means, whereby to permit free turning of the spinner in either direction relative to the handle.

8. In a manually propelled rotary device, the combination of a handle, an axle thereon, a spinner rotatably mounted on the axle, a circular ratchet on the spinner in substantially concentric relation to the axle, a pawl oscillatably mounted relative to the handle between the handle and spinner and held against turning relative to the handle, said pawl having one end portion extending radially relative to the axle for clutching engagement with the ratchet to provide an overrunning clutch connection between the handle and spinner for turning the spinner by rotary impulses from the handle in one direction relative to the handle, spring means tending to hold said pawl engaged with the ratchet, and means on the other end portion of the pawl for holding the same cocked in disengaged relation to the ratchet against the action of said spring means.

9. In a manually propelled rotary device, the combination of a handle, an axle thereon, a spinner rotatably mounted on the axle, a circular ratchet on the spinner in substantially concentric relation to the axle, a pawl loosely mounted on the axle between the end of the handle and the spinner but held against turning relative to the axle and handle, said pawl having one end portion thereof extending radially relative to the axle for clutching engagement with the ratchet to provide an overrunning clutch connection between the handle and spinner for handle propelled rotation of the spinner relative to the handle in one direction, spring means tending normally to urge said end portion toward the ratchet, said pawl having a fulcrum portion intermediate the ends thereof for engagement with the spinner and relative to which the pawl is adapted to be oscillated, and manually operable means on the other end of said pawl for tilting the pawl about its fulcrum point against the action of said spring means so as to cause disengagement of the pawl from the ratchet.

10. In a manually propelled rotary device, the combination of a handle, an axle thereon, a spinner rotatably mounted on the axle, a circular ratchet on the spinner in substantially concentric relation to the axle, a pawl loosely mounted on the axle between the end of the handle and the spinner, said pawl having one end portion thereof extending radially relative to the axle for clutching engagement with the ratchet to provide an overrunning clutch connection between the handle and spinner for handle propelled rotation of the spinner relative to the handle in one direction, spring means tending normally to urge said end portion toward the ratchet, said pawl having a fulcrum portion intermediate the ends thereof for engagement with the spinner and relative to which the pawl is adapted to be oscillated, and a hook portion on the other end of said pawl projecting outwardly from the spinner through an opening provided therefor in the end of the handle, whereby to hold the pawl against turning relative to the handle, said hook portion being also adapted for manual engagement to tilt the pawl about its fulcrum point against the action of the aforesaid spring means to disengage the pawl from the ratchet.

11. In a manually propelled rotary device, the combination of a handle, an axle thereon, a spinner rotatably mounted on the axle, a circular ratchet on the spinner in substantially concentric relation to the axle, a pawl loosely mounted on the axle between the end of the handle and the spinner, said pawl having one end portion thereof extending radially relative to the axle for clutching engagement with the ratchet to provide an overrunning clutch connection between the handle and spinner for turning the spinner relative to the handle in one direction, said pawl having a fulcrum portion intermediate the ends thereof and on the opposite side of the axle from the ratchet engaging end portion, said fulcrum portion being arranged to engage the spinner for tilting movement of the pawl relative to the ratchet for disengagement, a leaf spring acting between the fulcrum portion and the handle to urge the pawl toward the ratchet, and a hook portion on that end of the pawl next to the fulcrum portion extending outwardly relative to the spinner through an opening provided therefor in the end of the handle, whereby to hold the pawl against turning relative to the handle, said hook portion being also adapted for manual engagement to tilt the pawl about its fulcrum point against the action of the aforesaid leaf spring to disengage the pawl from the ratchet.

12. A reel of the class described, comprising a handle, an axle extending from the end thereof, a reel comprising a substantially circular sheet metal body member having a substantially conical hollow central portion projecting from the plane thereof with the apex portion outermost, a bearing on said apex portion receiving said axle, a ratchet plate secured to said body member on the opposite side thereof from said conical portion having a bearing thereon in concentric relation to and axially spaced from the first named bearing and receiving said axle for rotary support of the reel thereon, said ratchet plate having a circular series of ratchet teeth in substantially concentric relation with the axle and projecting toward the handle, a pawl drivingly connected with the end of the handle adjacent the reel and extending radially relative to the axle for engagement with the ratchet teeth to provide an overrunning clutch connection between the handle and reel for turning the reel relative to the handle in one direction, spring means urging said pawl toward engagement with the ratchet teeth, and manually operable means for holding the pawl in disengaged position against the action of said spring means.

13. As an article of manufacture, a sheet metal body for a reel of the class described, comprising a one-piece sheet metal body member of generally circular form having radially projecting spokes on the periphery thereof, alternate spokes being bent from the plane of said body member in one direction and intermediate spokes being bent from the plane of said body member in the opposite direction to define between said spokes an annular winding groove or channel, bearing means at the center of said body member for rotatably mounting the same on a support, and ring members joining the outer ends of the spokes in substantially concentric relation with the bearing means.

14. As an article of manufacture, a sheet metal body for a reel of the class described, comprising a one-piece sheet metal body member of generally circular form having radially projecting spokes on the periphery thereof, alternate spokes being bent from the plane of said body member in one direction and intermediate spokes being bent from the plane of said body member in the opposite direction to define between said spokes an annular winding groove or channel, ring members joining the outer ends of the spokes in substantially concentric relation with the body member, the central portion of the body member being formed to hollow conical form with the apex portion outermost, the apex portion being of tubular form to provide a bearing, and a plate secured to said body member on the opposite side thereof from the conical portion and having a tubular central portion in coaxial relation to the aforesaid bearing to provide a second bearing, the two bearings being adapted to receive a supporting axle.

15. An article of manufacture as set forth in claim 14, wherein the last named plate is formed to provide a circular ratchet in concentric relation with the tubular bearing portion, said plate being preferably of hardened metal.

16. A article of manufacture as set forth in claim 13, wherein at least one of the spokes has an elongated slot provided therein extending lengthwise thereof, the sheet metal from the slot being bent outwardly to form a hook.

17. A reel of the class described comprising a handle, an axle extending from one end of the handle, a reel rotatable freely on said axle in either direction relative to the handle, and means providing a one-way drive overrunning clutch drivingly connecting the handle and reel for turning the reel by rotary impulses from the handle in one direction relative to the handle.

18. In a manually propelled rotary device, the combination of a handle, an axle thereon, a spinner rotatably mounted on the axle, a circular ratchet on the spinner in substantially concentric relation to the axle, and a pawl drivingly connected with the end of the handle adjacent the spinner and extending radially relative to the axle for engagement with the ratchet to provide a one-way drive overrunning clutch connection between the handle and spinner for turning the spinner by rotary impulses from the handle in one direction relative to the handle.

19. A reel as set forth in claim 4, wherein said manually operable means is also adapted to press the pawl into tight frictional engagement with the reel to act as a brake shoe.

20. A manually propelled rotary device as set forth in claim 9, wherein said manually operable means is also adapted to press the pawl into tight engagement with the spinner to act as a brake shoe.

HOKAN A. LOFGREN.

REFERENCES CITED

The following references are of record in the file of this patent:

UNITED STATES PATENTS

| Number | Name | Date |
| --- | --- | --- |
| 816,328 | Holt | Mar. 27, 1906 |
| 1,866,282 | Wuest | July 5, 1932 |
| 2,168,675 | Lofgren et al. | Aug. 8, 1939 |